April 17, 1962 D. J. LEONARD ETAL 3,030,448

PCM TELEPHONE SIGNALING

Filed Dec. 30, 1960 3 Sheets-Sheet 1

INVENTORS D. J. LEONARD
R. H. SHENNUM
BY R. B. Ardis
ATTORNEY

TERMINATING OFFICE

INVENTORS D. J. LEONARD
R. H. SHENNUM

R. B. Ardis

ATTORNEY

April 17, 1962 D. J. LEONARD ETAL 3,030,448

PCM TELEPHONE SIGNALING

Filed Dec. 30, 1960 3 Sheets-Sheet 3

FIG. 3

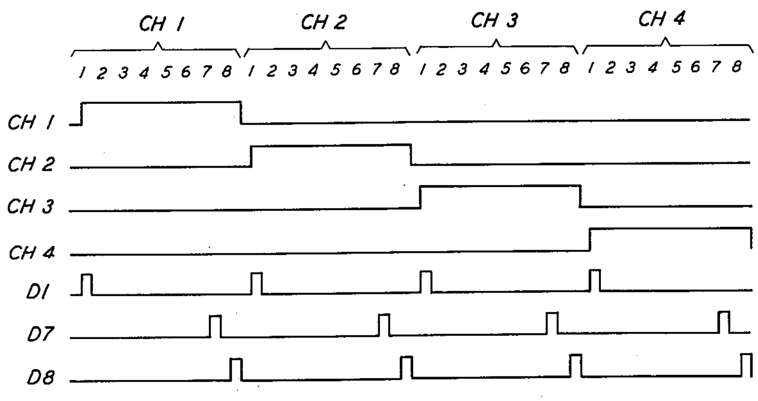

FIG. 4

| ORIGINATING OFFICE ⟶ TERMINATING OFFICE | | | |
|---|---|---|---|
| CONDITION | D8 | SIG RELAY | MEANING |
| OPEN LOOP | 1 | OPERATED | IDLE |
| CLOSED LOOP | 0 | RELEASED | BUSY |

FIG. 5

| TERMINATING OFFICE ⟶ ORIGINATING OFFICE | | | | | |
|---|---|---|---|---|---|
| CONDITION | D7 | RP RELAY | D8 | SUP RELAY | MEANING |
| NORMAL BATTERY (-T) | 0 | RELEASED | 1 | OPERATED | ON-HOOK |
| REVERSED BATTERY (-R) | 1* | RELEASED | 0 | RELEASED | OFF-HOOK |
| INTERRUPTED CURRENT | 1 | OPERATED | 1 | OPERATED | REVERTIVE PULSE |

*UNDER CONTROL OF ENCODER

INVENTORS D. J. LEONARD
R. H. SHENNUM

BY R. B. Ardis

ATTORNEY

United States Patent Office 3,030,448

Patented Apr. 17, 1962

3,030,448

PCM TELEPHONE SIGNALING

Donald J. Leonard, Hillsborough Township, Somerset County, and Robert H. Shennum, Berkeley Heights, N.J., assignors to Bell Telephone Laboratories, Incorporated, New York, N.Y., a corporation of New York Filed Dec. 30, 1960, Ser. No. 79,682
6 Claims. (Cl. 179—15)

This invention relates generally to pulse type communication systems and more particularly, although in its broader aspects not exclusively, to time division multiplex pulse code modulation systems for use between telephone central offices in the so-called exchange area.

When a number of metallic-pair voice-frequency telephone transmission lines are replaced by a single multichannel carrier trunk, each carrier channel must, if it is to be fully compatible with the associated switching equipment, be capable not only of carrying the same message information as the voice pair it replaces but also of passing the same form of signaling information. It should, in other words, accept both voice messages and signaling information in the form they would have if they were to be impressed upon a metallic pair and should reproduce both in substantially their original form at the other end of the line if need for complicated alterations in the associated switching equipment is to be avoided. A number of techniques are known for transmitting signaling information over the respective channels in conventional frequency division multiplex carrier systems, but most are not readily applicable to time division multiplex systems of the pulse code modulation type. Those that are applicable tend to be so only at the cost of unwarranted circuit complexity due to unnecessary duplication of function.

Signaling in a telephone system may conveniently be divided into the two broad classifications of supervisory and control signaling. The first permits a subscriber or an operator to initiate a request for service, holds or releases a connection after it has been established, or recalls an operator on a previously established connection. The second permits information to be passed over the line to direct the establishment of a particular desired connection. Since, at least between central offices in the so-called exchange area, the type of signaling generally encountered that places the most stringent requirements on the system is the form of control signaling known as revertive pulsing, it is to revertive pulsing that the description of the invention is primarily directed. The principles underlying the invention are, of course, applicable to other forms of signaling as well, particularly to others based upon the rapid transmission of several two-state signals simultaneously in either one or both directions over the trunk.

Revertive pulsing between telephone central offices owes its existence to the nature of the operation of certain types of central office switching equipment. Some switching devices, notably panel selectors, are driven by their own power over banks of terminals and signal their position by producing pulses as the respective terminals are passed over. In each such installation, these pulses are counted and the switch is stopped when the desired position is reached. The operation of such equipment from a central office at the remote end of the trunk is known as revertive pulsing since that office controls the setting of switches by means of pulses which "revert" back over the trunk. The central office at which the call originates generates only start and stop indications in the form of busy and idle signals.

Revertive pulsing trunks originate calls in only one direction. The central office at which the call is initiated is termed the originating office, while that at which the call is received is known as the terminating office. The terminating office normally supplies the originating office with a negative voltage known as "battery" on the so-called tip side of the line and ground on the so-called ring side of the line to indicate an on-hook condition at the terminating office. The originating office transmits a start signal by becoming busy, causing current to flow in the terminating office. The terminating office thus sends back momentary interruptions in the current flow called revertive pulses as its switching equipment passes over its terminal contacts. When the proper number of revertive pulses have been received, the originating office transmits a stop signal by becoming idle and interrupting the flow of current. The switching equipment at the terminating office then advances to the next selector and the sequence is repeated as often as necessary until the called number is reached. When the called subscriber answers his telephone, the terminating office reverses the polarity of the direct voltage supplied to the originating office, placing ground on the tip side of the line and battery on the ring side.

In the past, a preferred way of transmitting revertive pulsing information over a multichannel time division multiplex pulse code modulation message transmission system employing a predetermined number of digit spaces per channel for message transmission has been that disclosed in copending application Serial No. 63,737, which was filed October 20, 1960, by D. C. Weller. In that arrangement, an exclusively signaling digit space was added to each channel and used to transmit idle or busy signals from the originating office toward the terminating office and to transmit revertive pulses from the terminating office back toward the originating office. A second path for the transmission of on-hook or off-hook signals from the terminating office back toward the originating office was obtained through use of the least significant regular message digit space in each channel. When a channel was on-hook at the terminating office, the no-signal condition of the encoder placed no pulse (i.e., binary "0") in the least significant message digit space. When the same channel was off-hook at the terminating office, a random pulse (i.e., binary "1") was permitted to appear in the least significant message digit space. The presence of either a telephone message or noise on the incoming line caused pulses to appear randomly in the least significant message digit space. The least significant message digit space was scanned at the originating office for the purpose of detecting the difference between the two signaling states, i.e., the difference between binary "0" and the random presence of binary "1." In that manner, two signaling channels from the terminating office toward the originating office were obtained at the cost of only one added digit space.

The arrangement disclosed in the Weller application was found to be subject to error in the transmission of on-hook or off-hook signaling information from the terminating office back toward the originating office unless precautions were taken to hold noise or no-signal encoder level drifts in the terminal equipment to a very low level. Otherwise, such noise or drifts tended to cause pulses to appear randomly in the least significant digit message space and false signaling information was transmitted. The precautions required to hold such noise to an acceptably low level, unfortunately, tended to increase the complexity and cost of the equipment involved. In addition, the prior art arrangement had the disadvantage of appearing on-hook during prolonged listening periods since the least significant digit was no longer random under such circumstances.

A principal object of the present invention, therefore, is to improve signaling reliability in a pulse type communication system in as simple and inexpensive a manner as possible.

Another and more particular object is to eliminate the possibility of transmitting false signaling information due to noise in a pulse code modulation telephone system.

Still other objects are to afford affirmative control over the transmission of on-hook or off-hook signaling information in a pulse code modulation telephone system and to avoid any signaling dependency upon the random receipt of pulses in any designated digit space.

In accordance with the present invention, signaling reliability in a digital message transmission system requiring several two-state non-message signaling channels under some signaling conditions and using only one digit space exclusively for signaling purposes is improved by removing control of the needed additional message digit spaces from the message transmitting equipment during one state of the signaling information transmitted in the exclusively signaling digit space, transmitting the remaining non-message signals in these non-message digit spaces, and restoring control of the affected message digit spaces to the message transmitting equipment during the other state of the signal transmitted in the exclusively signaling digit space. In this manner, positive control is afforded over the transmission of all non-message signals and no such signal is dependent for its accurate transmission on the ability of receiving equipment to distinguish between the random presence of a pulse and the forced absence of a pulse in any given digit space.

In the context of a pulse code modulation telephone system equipped for reverting pulsing, the invention provides affirmative control over the transmission of on-hook and off-hook information over a connecting trunk from a terminating central office back to the originating central office. In accordance with the invention, the exclusively signaling digit space is used to transmit on-hook and off-hook information and to remove control of the least significant message digit space from the pulse code modulation encoder during on-hook periods. The least significant digit space is used to transmit revertive pulses during on-hook periods, and control of the least significant message digit space is restored to the encoder during off-hook periods. Since affirmative control over the least significant message digit spaces is afforded through the exclusively signaling digit space, signaling reliability is not dependent upon maintenance of inconveniently low noise levels in the transmitting and receiving terminal equipment.

A more complete understanding of the invention may be obtained from a study of the following detailed description of one specific embodiment arranged to provide revertive pulsing between telephone central offices in a multichannel time division multiplex pulse code modulation system. In the drawings.

Figure 1:
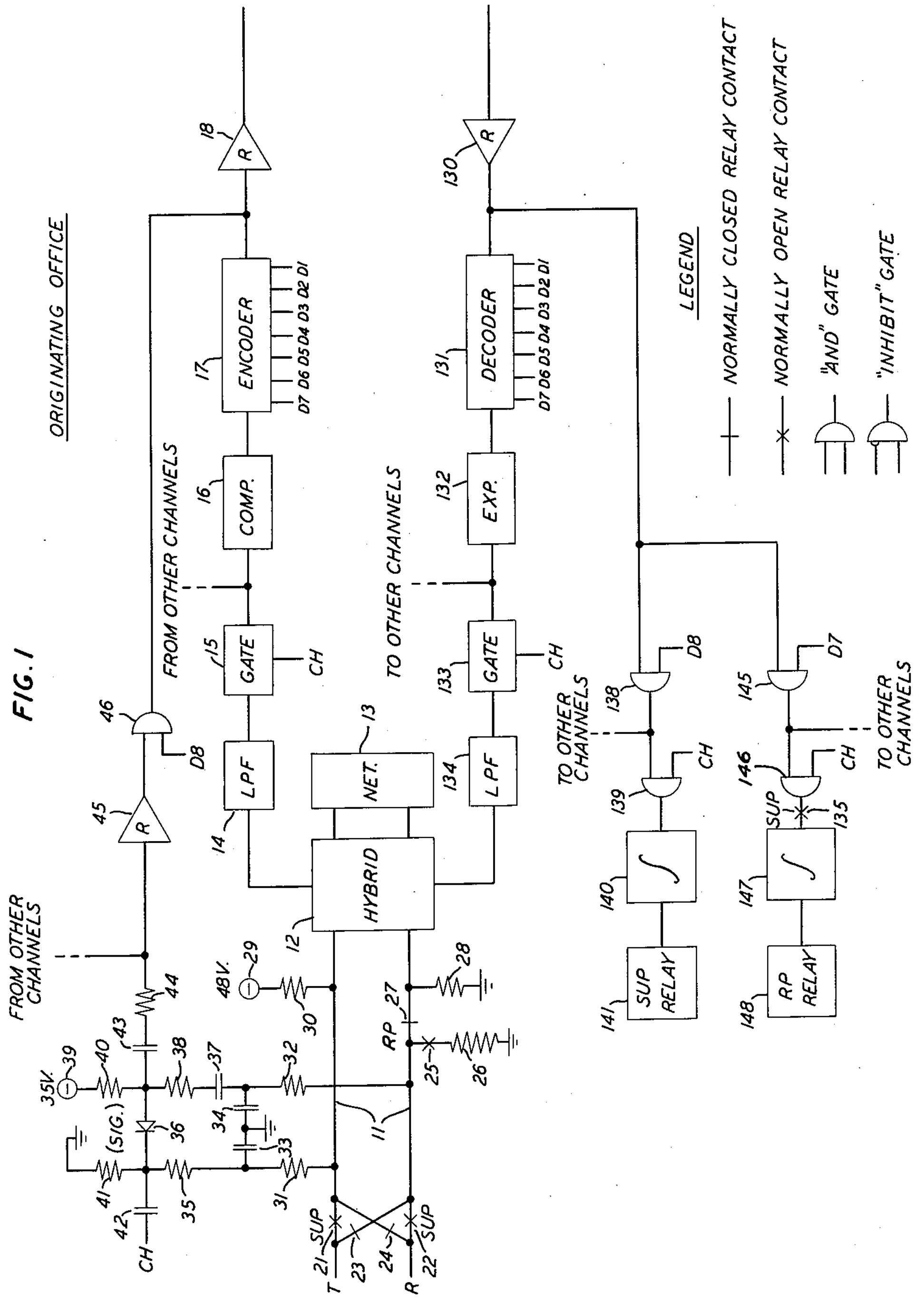
FIG. 1 shows the pulse code modulation equipment used at the originating central office in an embodiment of the invention.
Figure 2:
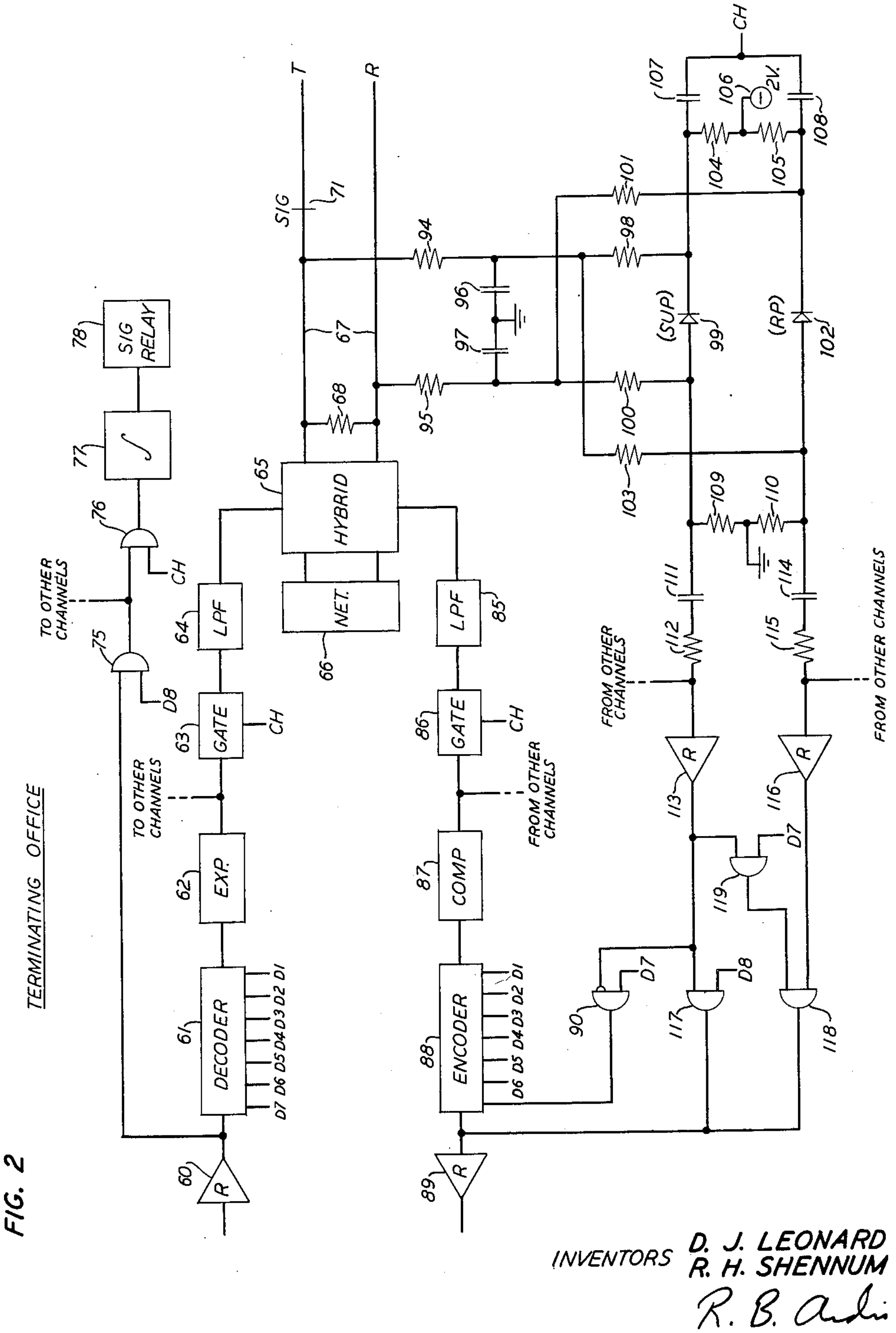
FIG. 2 illustrates the pulse code modulation equipment used at the terminating central office in the same embodiment of the invention.

FIG. 3 illustrates several of the control pulse waveforms used in the embodiment of the invention shown in FIGS. 1 and 2; and FIGS. 4 and 5 are charts showing the operation of the circuitry of FIGS. 1 and 2 under the different signaling conditions required for reverting pulsing.

The multichannel time division multiplex pulse code modulation telephone trunk illustrated in FIGS. 1 and 2 is used to replace a multiplicity of metallic-pair voice-frequency lines between telephone central offices. Only one channel is illustrated in detail at each office, but the points at which the remaining channels are connected are indicated. As shown, this channel terminates in a two-wire voice-frequency line at each central office where it is connected to the usual central office switching equipment. As indicated above, the trunk is equipped for revertive pulsing to illustrate the application of the principles underlying the present invention.

In FIG. 1, the two-wire voice-frequency line 11 from the originating central office is connected to a hybrid network 12 which is, in turn, terminated by a suitable balancing network 13. Transmission beyond hybrid network 12 is on a four-wire basis, with the two directions of transmission separated by the conjugacy of hybrid network 12. The transmitting path from hybrid network 12 takes the form of a low-pass filter 14, a channel sampling gate 15, a compressor 16, a pulse code modulation encoder 17, and a transmitting regenerative pulse amplifier 18. Filter 14 serves to limit the top frequencies of the transmitted voice-frequency messages to 4 kilocycles, for example, and gate 15 is enabled by a so-called channel pulse at an 8 kilocycle rate. As shown in the first four lines of FIG. 3, the channel pulses assigned to each channel are displaced in time from all other channel pulses, with the result that the input applied to compressor 16 is a time division multiplexed sequence of samples from all of the channels being transmitted. As indicated, samples from the other channels are interleaved in time with those from gate 15 at the input of compressor 16.

As is now common practice in many multichannel carrier systems, the embodiment of the invention illustrated in FIGS. 1 and 2 is provided with compandors in order to improve the signal-to-noise ratio of the system. In each direction of transmsision, a compandor takes the form of a volume compressor at the transmitting terminal followed by a complementary volume expandor at the receiving terminal. In a pulse code modulation system, the effect of the compandor is to increase the percentage of the encoder volume range that is used by low volume messages, thereby reducing the amount of so-called quantizing noise at low volume levels.

Compressor 16 in the transmitting path in FIG. 1 is followed by pulse code modulation encoder 17. As shown, encoder 17 is a seven-digit encoder. It employs seven message digits per channel in the time scale, in other words, to translate each compressed sample applied to it into a binary code group of pulses (binary "1") and spaces (binary "0") occupying seven consecutive digit spaces or time slots. To control the timing of encoder 17, timing pulses which recur during the same numbered time slot of each code group are applied to the timing control leads D1 through D7. As shown in the fifth line of FIG. 3, the D1 lead is energized during the first time slot or digit space of each code group and controls the timing of the generation of the marks or spaces in the most significant digit space. As shown in the sixth line of FIG. 3, the D7 lead is energized during the seventh time slot of each code group and controls the timing of the generation of the pulses or spaces in the least significant digit space. The D2 through D6 leads are energized in a similar manner during their respective digit spaces or time slots. Encoder 17 may, by way of example, take the form of the network type of encoder disclosed in copending application Serial No. 744,190, which was filed June 24, 1958, by R. E. Yager.

The transmitting regenerative pulse amplifier 18 is connected to receive the multiplexed binary code groups generated by encoder 17 and serves to insure uniformity of pulses for transmission over the trunk to the receiving equipment at the terminating central office.

The portion of the originating office transmitting circuitry which has thus far been described is conventional at the present stage of development of the pulse code modulation art. The remaining transmitting and voice-frequency circuitry illustrated in FIG. 1 is provided to furnish a signaling path from the originating office to the terminating office and to complete the two signaling paths required for revertive pulsing from the terminating office back toward the originating office.

Near the left-hand end of two-wire voice line 11 in

FIG. 1, relay contacts 21 and 22, which are closed when their relay is operated, are connected in series in the tip and ring sides (marked T and R, respectively) of the line. Cross-connections between the tip and ring sides of the line contain relay contacts 23 and 24, which are open when the relay is operated. All of these relay contacts, as will be explained later, belong to a so-called Sup (for supervisory) relay controlled from the terminating office and are used to reverse battery polarity on line 11 in response to an off-hook signal. Farther to the right, normally open relay contacts 25 are connected from the ring side of the line through a large resistor 26 to ground and normally closed contacts 27 connect the ring side of the line to hybrid 12. Relay contacts 25 and 27 belong to a so-called RP (for revertive pulse) relay controlled from the terminating office and are used to interrupt the flow of current at the originating office to reconstruct reverive pulses. Just to the left of hybrid 12, the ring side of the line is grounded through a small resistor 28 and the tip side is connected to a negative 48-volt source 29 through a small resistor 30.

A signaling path to the terminating office begins just to the right of the Sup relay contacts, where a pair of isolating resistors 31 and 32 are connected to the respective tip and ring sides of the line. A pair of capacitors 33 and 34 are connected from the ends of isolating resistors 31 and 32 to ground and, with resistors 35 and 38, prevent channel pulse frequency components from adversely affecting the performance of the talking path. The end of isolating resistor 31 remote from the line is connected through resistor 35 to the cathode terminal of a signaling detector diode 36. The corresponding end of isolating resistor 32 is connected through the series combination of a direct-current blocking capacitor 37 and resistor 38 to the anode terminal of diode 36. Diode 36 is a switch which operates to control a so-called Sig (for signaling) relay at the terminating office. Bias is provided by a negative 35-volt source 39 connected through a resistor 40 to its anode terminal and by a resistor 41 connected from its cathode terminal to ground. The cathode terminal of diode 36 is supplied through a coupling capacitor 42 with channel pulses from the same source that controls channel sampling gate 15. The anode terminal of diode 36 is connected to an output path which includes, in succession, a coupling capacitor 43, a resistor 44, a pulse amplifier 45, and an AND gate 46 and is connected to the input side of transmitting amplifier 18.

Similar signaling path circuitry from other channels is connected into the common transmitting path at the input side of regenerative pulse amplifier 45. In the common path, AND gate 46, which is enabled only when all of its input leads are energized, is supplied with digit pulses during the eighth digit space assigned to each channel. This eighth digit space is exclusive of the digit spaces used in each channel for telephone message transmission and its use for the transmission of two-state signaling information does not, therefore, detract from the quality of telephone message transmission. The eighth digit space control pulses are illustrated in the bottom line of FIG. 3.

The signaling circuitry which has just been described is the Sig detector and monitors two-wire line 11 to determine whether or not the office is busy. When the originating office is idle, the office end of line 11 is open-circuited and no current flows. Under these conditions, diode 36 is forward biased by the combination of negative 48-volt source 29 and negative 35-volt source 39 and channel pulses are permitted to trigger pulse amplifier 45 for transmission out over the line. When the originating office is busy, on the other hand, the office end of line 11 is substantially short-circuited and ground potential, instead of a negative 48-volt potential, is applied to the cathode terminal of diode 36. Under such conditions, diode 36 is back biased and the transmission of channel pulses is blocked. Through the action of AND gate 46, binary "1" is thus transmitted during the eighth digit space in any channel in response to an idle or open loop condition and binary "0" is transmitted during the eighth digit space in response to a busy or closed loop condition. This operation is tabulated for easy reference in FIG. 4.

The message and signaling receiving circuitry at the other end of the carrier line is illustrated in FIG. 2. There, a receiving regenerative pulse amplifier 60 recovers and regenerates the pulse pattern transmitted by amplifier 18 in FIG. 1. The output of receiving amplifier 60 is passed through a pulse code modulation decoder 61 which may, for example, be of the type disclosed in United States Patent 2,991,442, which issued July 4, 1961, to R. E. Yaeger. Control pulses are supplied to decoder 61 during digit spaces D1 through D7 in each channel to control decoder timing. The output of decoder 61 is passed through an expandor 62 and the output of the latter is in the form of the same succession of message samples that were applied to compressor 16 in FIG. 1. Message distribution to each of the receiving channels takes place at that point.

In the illustrated receiving channel, the output side of expandor 62 is connected through a channel gate 63 and a low-pass filter 64 to a hybrid network 65. The channel pulses of the channel concerned are applied to channel gate 63 to separate the message samples of this channel from those of others. The channel pulses for the first four channels are, it will be recalled, illustrated in the front four lines of FIG. 3. Low-pass filter 64 removes the high frequency components from the message samples for this particular channel leaving the message in its original form. Hybrid 65 is terminated by a balancing network 66.

To the right of hybrid network 65, transmission is once again on a two-wire basis through a transmission line 67. A small resistor 68 is connected between the tip and ring sides of two-wire line 67 just to the right of hybrid network 65 to provide direct-current continuity for signaling purposes.

The portion of the terminating office receiving circuitry which has just been described up to this point is largely conventional. The remaining receiving and common circuitry is provided to complete the signaling path for the transmission of idle and busy information from the originating central office. A pair of relay contacts 71, which are open when the relay is operated, are connected in series with the tip side of two-wire line 67. These contacts belong to a so-called Sig (for signaling) relay and are used to create open and closed loop conditions on line 67 in response to idle or busy signals received from the originating office.

The exclusively signaling circuitry in FIG. 2 begins to the right of receiving amplifier 60, where one input lead of an AND gate 75 is connected to the line. The other input lead of AND gate 75 is supplied with digit pulses during the eighth digit space assigned to each channel. For the channel illustrated, the output lead of AND gate 75 is connected through another AND gate 76 (which is controlled by channel pulses) and an integrating circuit 77 to a Sig (for signaling) relay 78. This circuitry is the Sig regenerator and, as shown in tabular form in FIG. 4, serves to operate relay 78 in response to binary "1" received from the eighth digit space and to release it in response to binary "0" received from the eighth digit space. The function of integrating circuit 77 is to build up sufficient current to provide rapid operation of relay 78 and to hold this state of operation between successive driving digit pulses.

Relay contacts 71 in FIG. 2 are the contacts of Sig relay 78. As indicated in FIG. 4, they are open in the presence of binary "1" in the eighth digit space, thus recreating an open loop condition on line 67 as an idle signal. They are closed in the presence of binary "0" in the eighth digit space, recreating a closed loop condition as a busy signal. The direct-current signaling state recreated on line 67 is, therefore, substantially identical to the one appearing on two-wire line 11 in FIG. 1, permitting switching equipment at both central offices to operate just as if no pulse code modulation system intervened The pulse code modulation equipment operating in the direction from the terminating office to the originating office is substantially the same as that operating in the opposite direction, which has already been described. A low-pass filter 85 is connected to hybrid network 65 and is isolated from filter 64 in the receiving path by the conjugacy of hybrid network 65. Beyond filter 85 in the transmitting path are a channel gate 86, a compressor 87, a pulse code modulation encoder 88, and a transmitting regenerative pulse amplifier 89. Other channels are multiplexed for transmission at the input side of compressor 87. Encoder 88 is like encoder 17 in FIG. 1 in all respects except that, for reasons which will be explained later, it receives its seventh digit timing pulses from an Inhibit gate 90. Such a gate is enabled whenever its Inhibit terminal (indicated by the small semicircle in the symbol) is energized. As has already been explained, the present invention provides two high-speed signaling paths from the terminating office back to the originating office which are improved in reliability over those provided by the prior art. As shown in tabular form in FIG. 5, these paths are used to transmit on-hook or off-hook signals and to transmit revertive pulses.

At the terminating office, as shown in FIG. 2, the signaling states supplied by the central office switching equipment to two-wire line 67 are monitored by a pair of detectors. One of these, the Sup (for supervisory) detector, detects battery polarity while the other, the RP (for revertive pulse) detector, detects absence of current in the loop.

Between resistor 68 and relay contacts 71, a pair of isolating resistors 94 and 95 are bridged across two-wire line 67, with resistor 94 connected to the tip side and resistor 95 connected to the ring. A pair of capacitors 96 and 97 are connected to ground from the ends of resistors 94 and 95 remote from the line and, with resistors 98, 100, 101 and 103, prevent channel pulse frequency components from affecting the talking path.

Resistor 94 is also connected through resistor 98 to the cathode terminal of a signaling detector diode 99. Resistor 100 interconnects isolating resistor 95 and the anode terminal of diode 99. Diode 99 functions, in a manner which will be described, as a switch and ultimately controls a so-called supervisory relay at the originating office. Isolating resistor 95 is also connected through resistor 101 to the cathode terminal of a second signaling detector diode 102, which serves as a switch to control the operation of a so-called revertive pulse relay at the originating office. Resistor 94 is, in turn, connected through resistor 103 to the anode terminal of diode 102.

The cathode terminals of diodes 99 and 102 are connected together through a pair of series resistors 104 and 105, and the midpoint between the two resistors is connected to a negative 2-volt source 106. The two cathode terminals are also connected to the local source of channel pulses for the channel concerned through a pair of coupling capacitors 107 and 108.

To the left of detector diodes 99 and 102 in FIG. 2 the diode anode terminals are given a path to ground through resistors 109 and 110. The anode terminal of diode 99, then, is connected between a blocking capacitor 111 and a resistor 112 to a regenerative pulse amplifier 113, while the anode terminal of diode 102 is connected through a blocking capacitor 114 and a resistor 115 to a regenerative pulse amplifier 116. The signaling paths from other channels are connected for multiplexing, as shown, at the input sides of amplifiers 113 and 16.

The detector circuits shown in FIG. 2 are completed by three AND gates 117, 118, and 119. AND gates 117 and 118 have their outputs connected to the input side of transmitting regenerative pulse amplifier 89 in the main transmission path, while AND gate 119 has its output connected to one of the input leads of AND gate 118. One input lead each of AND gates 117 and 119 is connected to receive pulses from regenerative pulse amplifier 113, while the remaining input lead of AND gate 118 is connected to receive pulses from regenerative pulse amplifier 116. The remaining input leads of AND gates 117 and 119 are supplied with pulses during the eighth and seventh digit spaces, respectively. Pulses from amplifier 113 are also supplied to the Inhibit terminal of Inhibit gate 90, while the remaining terminal of that gate is supplied with pulses during the seventh or least significant message digit space of each channel.

The signaling circuitry which has just been described makes up the Sup (for supervisory) and RP (for revertive pulse) detectors. These detectors monitor two-wire line 67 both to determine whether or not current is flowing and to determine the direction of current flow. No current flows when the central office switching equipment supplies a revertive pulse to line 67. Current flows in line 67 at all other times, the direction of current flow depending upon whether an on-hook or off-hook condition is present at the terminating office.

In the absence of a revertive pulse, the central office supplies a direct voltage, termed battery, to two-wire voice line 67 in FIG. 2. For an on-hook condition, so-called normal battery is applied. In this condition, the tip side of the line is held at a negative 48-volt potential while the ring side is grounded. The Sup diode 99 is forward biased by resistors 100 and 98, permitting channel pulses to pass through pulse amplifier 113 to AND gates 117 and 119 and to the Inhibit lead of Inhibit gate 90. Thus, in accordance with an important feature of the invention, the seventh or least significant message digit pulses are blocked from encoder 88 by Inhibit gate 90 during an on-hook condition. Control of the seventh or least significant message digit space is, in other words, removed from encoder 88 while the channel is not being used for commercial message transmission. In addition, AND gate 117 passes a pulse during the eighth or added non-message digit space, indicating an on-hook condition by the transmission of binary "1." The seventh or least significant message digit space is available for the transmission of revertive pulse information at no cost in transmission quality during the commercial portion of a telephone call.

Since pulses are passed by amplifier 113 during on-hook periods, the upper input lead of AND gate 119 is energized and seventh digit pulses are permitted to pass to AND gate 118. During an on-hook period, however, the negative 48-volt battery on the tip side of the line back biases RP diode 102 through resistors 101 and 103. Transmission of channel pulses to regenerative pulse amplifier 116 is blocked and no pulses are passed by AND gate 118 during the seventh digit space even though seventh digit timing pulses are received from AND gate 119.

For an off-hook condition, the terminating central office equipment reverses the battery polarity applied to two-wire line 67. The ring side of the line is held at a negative 48-volt potential, while the tip side is grounded. The Sup diode 99 is then back biased and channel pulses are prevented from reaching pulse amplifier 113. Under such conditions, the Inhibit terminal of Inhibit gate 90 is not energized and no pulses are applied to the upper input leads of either AND gate 117 or AND gate 119. Thus, seventh digit timing pulses are permitted to reach encoder 88 and, in accordance with an important feature of the invention, control of the seventh or least significant message digit space is restored to that element under conditions of commercial message transmission. Even though RP diode 102 is forward biased, pulses from regenerative pulse amplifier 116 cannot reach the line during the seventh digit space because AND gate 119 blocks seventh digit pulses from AND gate 118. Since AND gate 117 is not activated during the eighth digit space, binary "0" is transmitted during those intervals to indicate an off-hook condition.

In general, revertive pulsing takes place only while the terminating office is in an on-hook condition or, in other words, while the channel is not being used for commercial message transmission. The seventh or least significant message digit space can, therefore, be borrowed for transmission of revertive pulsing information without detracting from the commercial transmission quality of the line. Since six digit spaces are still available for message transmission, an operator may, if necessary, talk during an on-hook period with but a slight loss in transmission quality. Since such loss in transmission quality can never take place under an off-hook condition, however, the revertive pulse signaling path provided by the present invention has no adverse effect upon the transmission quality of the system as used for subscribers.

When the central office equipment connected to two-wire line 67 generates a revertive pulse, the flow of current between the tip and ring sides of the line is interrupted. Office battery is, therefore, prevented from biasing either Sup diode 99 or RP diode 102. Under these conditions, both diodes receive a forward bias from negative 2-volt source 106, the biasing path including resistors 104 and 109 on the one hand and resistors 105 and 110 on the other. Channel pulses are passed by both diodes and reach pulse amplifiers 113 and 116. Pulses from regenerative pulse amplifier 113 inhibit gate 90 and keep control of the seventh or least significant message digit space from encoder 88. At the same time, they energize AND gate 117 to supply binary "1" to the line during the eighth or added digit space and energize AND gate 119 to supply seventh digit pulses to AND gate 118. Since the lower input terminal of AND gate 118 is supplied with pulses from pulse amplifier 116, binary "1" is transmitted over the line during the seventh digit space.

The operation of the Sup and RP signaling circuitry which has just been described is tabulated in FIG. 5. As shown, control of the transmission of on-hook or off-hook information is affirmative at all times, without dependence upon the random transmission of a digit due to the presence of a message or noise on the line. Noise in the terminal equipment, which tends to be random in character, is of no important consequence as far as signaling is concerned. In accordance with an important feature of the invention, that eighth digit information is used to provide the same kind of positive control over the seventh or least significant message digit space. Control of the seventh digit space is, in accordance with the invention, seized for signaling purposes only during an on-hook period. During off-hook periods, control is relinquished to the encoder and normal use of that digit space is resumed.

As shown in FIG. 1, the pulse code modulation message transmission path is completed at the originating office by a receiving regenerative pulse amplifier 130 connected to hybrid network 12 through the series combination of a pulse code modulation decoder 131, an expandor 132, a channel gate 133, and a low-pass filter 134. These components are substantially identical to the corresponding components at the terminating office shown in FIG. 2 and will not be redescribed.

To complete the two signaling paths provided by the invention, the originating office equipment shown in FIG. 1 employs two signaling regenerators, both connected to the incoming line at the output side of receiving amplifier 130. Both regenerators are substantially identical to the Sig regenerator shown in FIG. 2, although one contains a pair of normally open relay contacts 135. The first of these regenerators, termed the Sup (for supervisory) regenerator, is a tandem chain made up of a pair of AND gates 138 and 139, an integrating circuit 140, and a Sup relay 141. As indicated in FIG. 1, Sup relay 141 controls polarity-reversing contacts 21 through 24 in two-wire line 11. AND gate 138 is driven by digit pulses during the eighth digit space of each channel, while AND gate 139 is driven by the channel pulses of the channel concerned. Corresponding channel gates connecting to other channels are coupled to the output side of AND gate 138.

The final originating office signaling regenerator is the RP (for revertive pulse) regenerator. It is made up of an AND gate 145 connected in series with an AND gate 146, an integrating circuit 147, an RP relay 148. Normally open relay contacts 135, which belong to Sup relay 141, are located between AND gate 146 and integrating circuit 147. This regenerator is like the Sup regenerator except that AND gate 145 is driven by digit pulses during the seventh or least significant message digit space of each channel. As indicated in FIG. 1, RP relay 148 controls relay contacts 25 and 27 in two-wire line 11.

The Sup and RP regenerators operate to reproduce on two-wire line 11 at the originating office substantially the identical direct-current signaling information supplied to two-wire line 67 at the terminating office by the local central office switching equipment. The manner in which this is done is, once again, tabulated in FIG. 5. Thus, when two-wire line 67 is on-hook at the terminating office, the originating office equipment illustrated in FIG. 1 receives binary "1" in the eighth or added digit space and binary "0" in the seventh or least significant message digit space. The binary "1" in the eighth digit space operates Sup relay 141, closing contacts 21 and 22 and opening contacts 23 and 24 in line 11, ad closing contacts 135 in the RP regenerator. The RP regenerator is enabled and the condition restored on two-wire line 11 is substantially identical to that detector at the terminating office, namely, a negative 48-volt potential from source 29 on the tip side of the line and ground on the ring through resistor 28.

In the absence of a revertive pulse, binary "0" is received during the seventh digit space, leaving RP relay 148 released. Binary "1" is received during the seventh or least significant message digit space during a revertive pulse, operating RP relay 148 and causing contacts 27 to open and contacts 25 to close. Resistor 26 is much larger than resistor 28 and the current flowing between the tip and ring sides of line 11 is reduced to a very small value or, in other words, interrupted.

Finally, when two-wire line 67 goes off-hook at the terminating office, the originating office receives binary "0" during the eighth digit space. Under such conditions, the Sup relay 141 releases, opening contacts 21 and 22, closing contacts 23 and 24, and effectively reversing the polarity of the direct voltage on two-wire line 11. Control of the seventh digit space has, in accordance with a feature of the invention, been restored to encoder 88 at the terminating office. Release of Sup relay 141 by the binary "0" received during the eighth digit space has opened contacts 135 to disable the RP regenerator, and RP relay 148 remains in its released state, unaffected by the contents of the seventh digit space while the pulse code modulation channel is being used for commercial message transmission.

It is to be understood that the above-described arrangement is illustrative of the application of the principles of the invention. Numerous other embodiments may be devised by those skilled in the art without departing from the spirit and scope of the invention.

What is claimed is:

1. In a digital message transmission system, a transmitter for converting message information into successive pulse code groups having a predetermined number of message digit spaces each and signaling means for transmitting at least two two-state non-message signals simultaneously under selected signaling conditions which comprises means for adding a further digit space to each code group exclusive of said message digit spaces, means to transmit a first of said non-message signals in said added digit space, means responsive to one state of said first non-message signal to remove control of at least one of the message digit spaces of each code group from said transmitter, means to transmit the remaining non-message signals in the message digit spaces thus removed from the control of said transmitter, and means responsive to the other state of said first non-message signal to restore control of the affected message digit spaces to said transmitter.

2. In a digital message transmission system, a transmitter for converting message information into successive pulse code groups having a predetermined number of message digit spaces each and signaling means for transmitting a pair of two-state non-message signals simultaneously during one state of a first of said non-message signals which comprises means for adding a further digit space to each code group exclusive of said message digit spaces, means to transmit said first non-message signal in said added digit space, means responsive to one state of said first non-message signal to remove control of one of the message digit spaces of each code group from said transmitter, means to transmit the remaining non-message signal in the message digit space thus removed from the control of said transmitter, and means responsive to the other state of said first non-message signal to restore control of the affected message digit spaces to said transmitter.

3. In a digital message transmission system, a transmitter for converting message information into successive pulse code groups having a predetermined number of message digit spaces each and signaling means for transmitting at least two two-state non-message signals simultaneously when said system is not being used for message transmission, a first of said non-message signals indicating use or non-use of said system for message transmission, said signaling means comprising means for adding a further digit space to each code group exclusive of said message digit spaces, means to transmit said first non-message signal in said added digit space, means responsive to said first non-message signal to remove control of at least one of the message digit spaces of each code group from said transmitter when said system is not being used for message transmission, means to transmit the remaining non-message signals in the message digit spaces thus removed from the control of said transmitter, and means responsive to said first non-message signal to restore control of the affected message digit spaces to said transmitter when said system is being used for message transmission.

4. In a pulse code modulation communication system, an encoder for converting message samples into successive permutation code groups having a predetermined number of digit spaces each and signaling means for transmitting a pair of two-state non-message signals simultaneously without interfering with message transmission which comprises means for adding a further digit space to each code group exclusive of said message digit spaces, means to transmit a first state of a first of said non-message signals in said added digit space when said system is not being used for message transmission, means to transmit the second state of said non-message signals in said added digit space when said system is being used for message transmission, means responsive to said first state of said first non-message signal to remove control of the least significant of the message digit spaces of each code group from said encoder, means to transmit the other of said non-message signals in said least significant message digit space, and means responsive to said second state of said first non-message signal to restore control of the least significant message digit space of each code group to said encoder.

5. In a pulse code modulation communication system, an encoder for converting message samples into successive binary code groups having a predetermined number of digit spaces each and signaling means for transmitting a pair of two-state non-message signals simultaneously without interfering with message transmission, a first of said non-message signals indicating use or non-use of said system for message transmission, said signaling means comprising means for adding a further digit space to each code group exclusive of said message digit spaces, means to transmit binary "1" in said added digit space when said system is not being used for message transmission, means to transmit binary "0" in said added digit space when said system is being used for message transmission, means responsive to binary "1" in said added digit space to remove control of the least significant of the message digit spaces of each code group from said encoder, means to transmit the other of said non-message signals in said least significant digit space, and means responsive to binary "0" in said added digit space to restore control of the least significant message digit space of each code group to said encoder.

6. In a pulse code modulation telephone system, an encoder for converting telephone message samples into successive binary code groups having a predetermined number of digit spaces each and signaling means for transmitting a pair of direct-current signals simultaneously while said system is not being used for message transmission, a first of said direct-current signals indicating the on-hook or off-hook condition of the system termination, said signaling means comprising means for adding a further digit space to each code group exclusive of said message digit spaces, means to transmit binary "1" in said added digit space when the system termination is in its on-hook condition, means to transmit binary "0" in said added digit space when the system termination is in its off-hook condition, means responsive to binary "1" in said added digit space to remove control of the message digit spaces of each code group from said encoder, means to transmit the other of said direct-current signals in said least significant digit space, and means responsive to binary "0" in said added digit space to restore control of the least significant message digit space of each code group to said encoder.

No references cited.